April 21, 1970     W. N. ROSTA     3,507,461

ROTARY WING AIRCRAFT

Filed June 16, 1967     10 Sheets-Sheet 1

INVENTOR
William N. Rosta

BY *[signature]*
ATTORNEY

April 21, 1970 — W. N. ROSTA — 3,507,461

ROTARY WING AIRCRAFT

Filed June 16, 1967 — 10 Sheets-Sheet 2

INVENTOR
William N. Rosta

BY
ATTORNEY

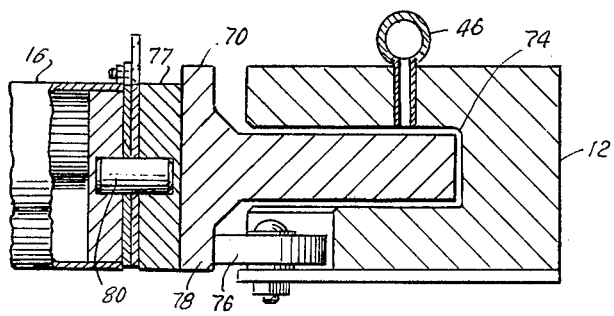
Fig. 4
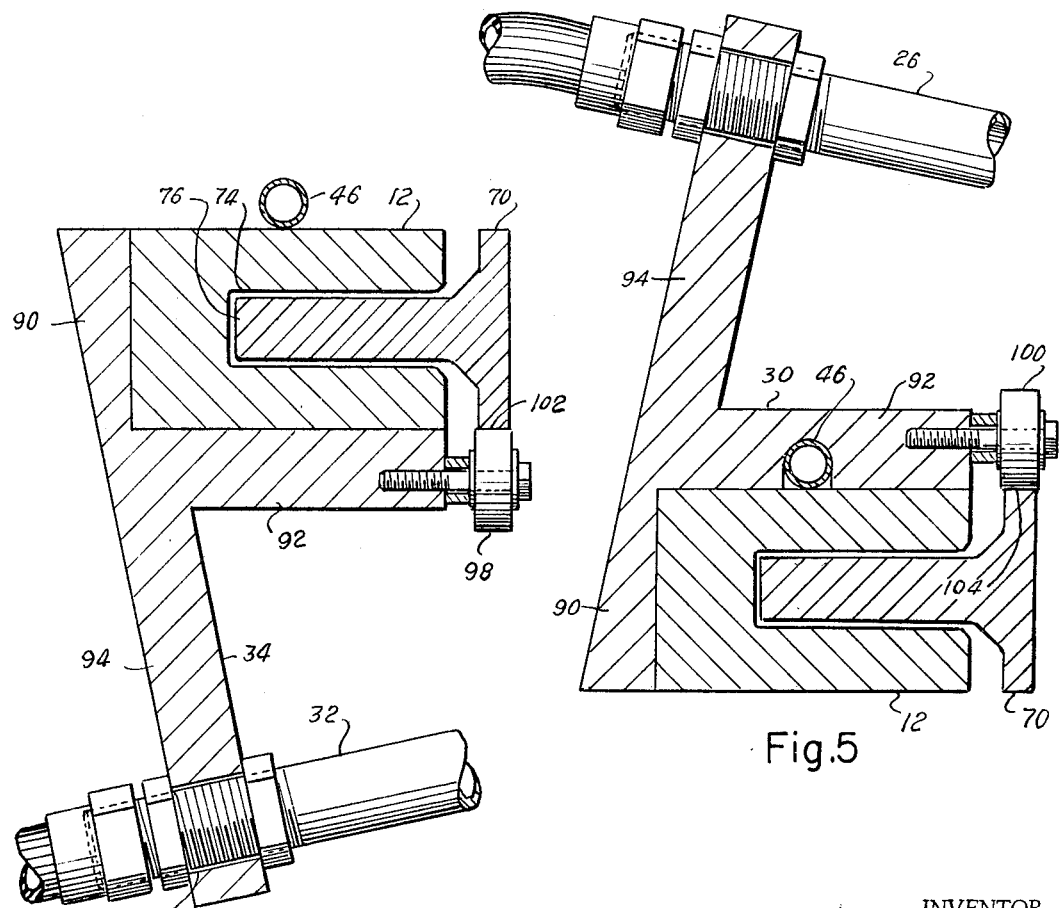
Fig. 5
Fig. 6
INVENTOR
William N. Rosta
BY [signature]
ATTORNEY April 21, 1970 W. N. ROSTA 3,507,461
ROTARY WING AIRCRAFT
Filed June 16, 1967 10 Sheets-Sheet 5

INVENTOR
William N. Rosta

BY *(signature)*
ATTORNEY

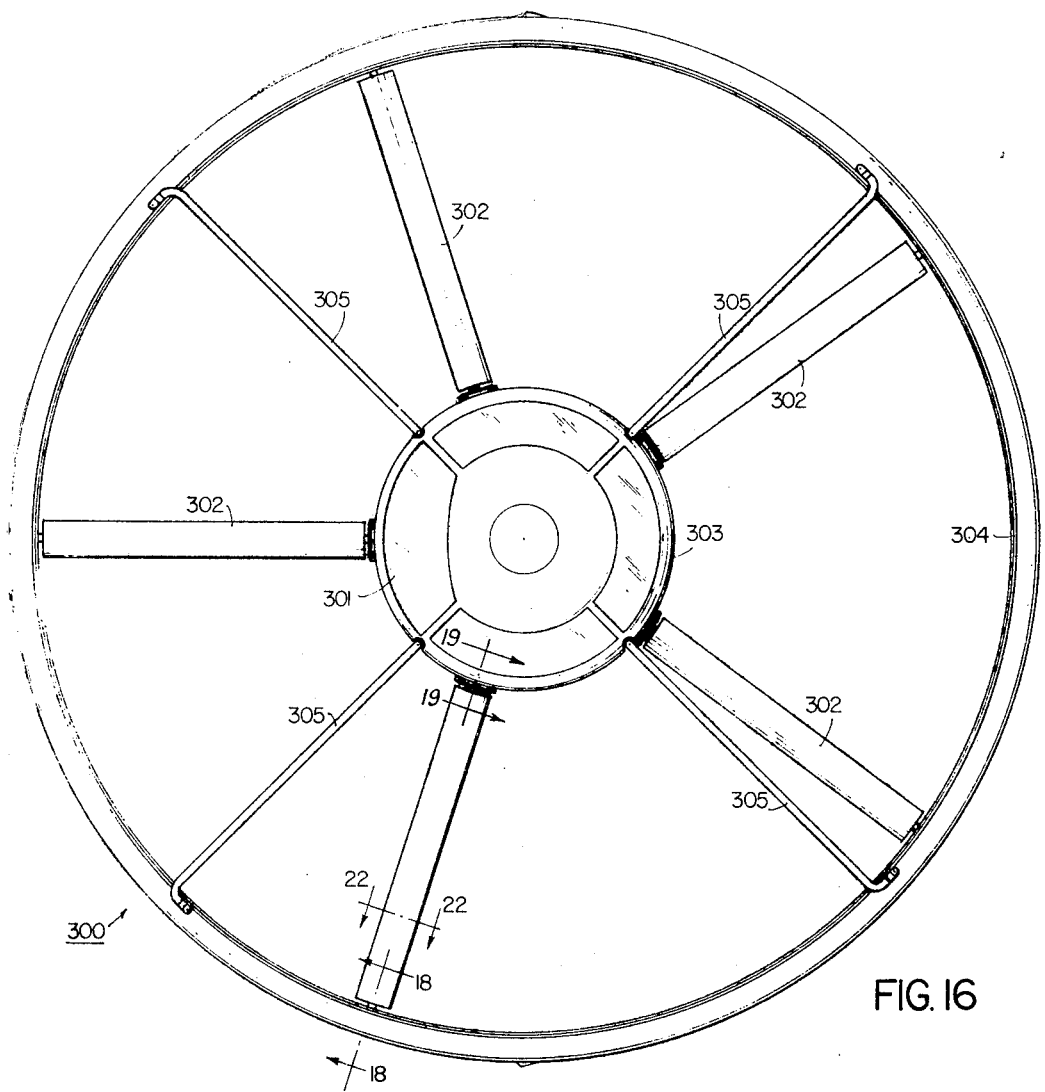
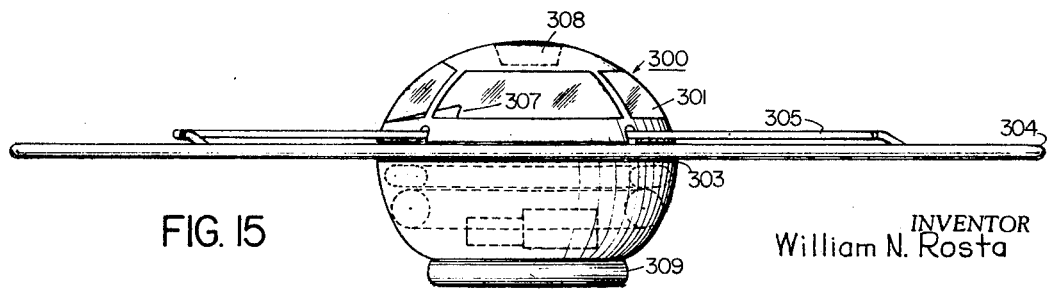

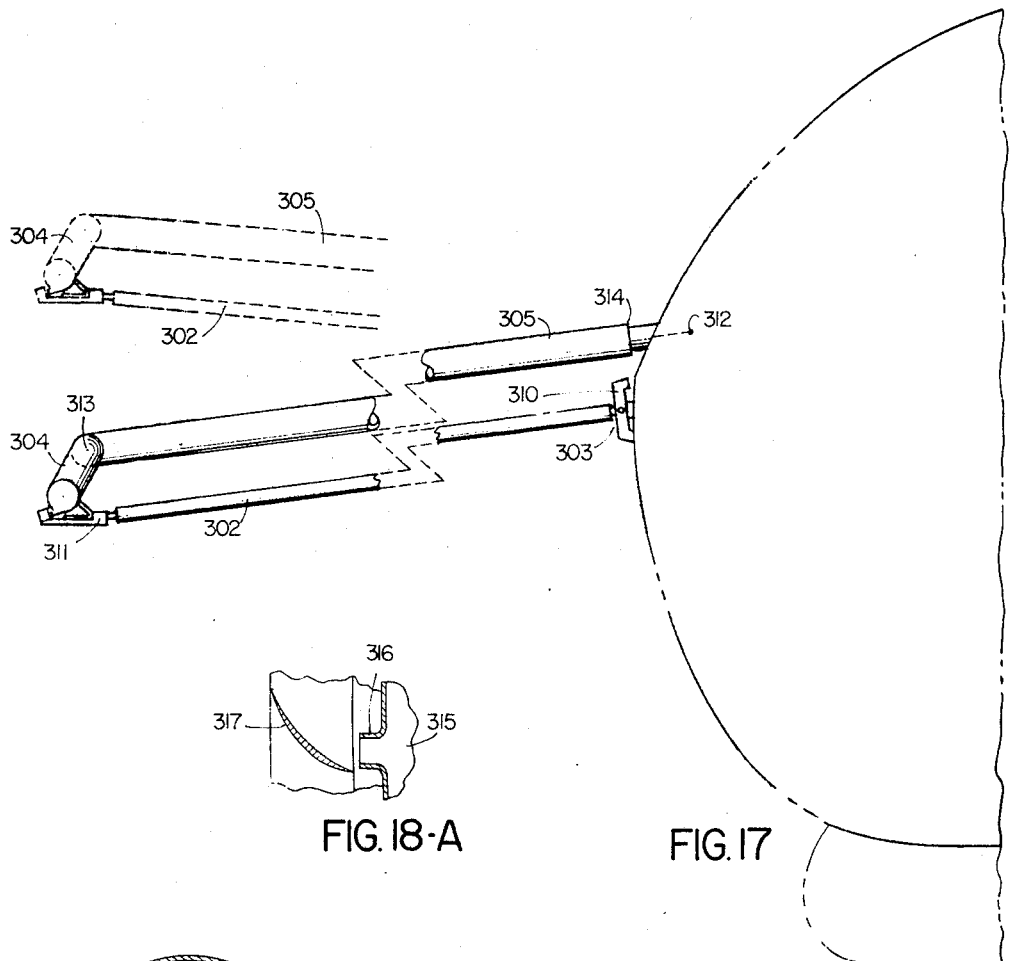
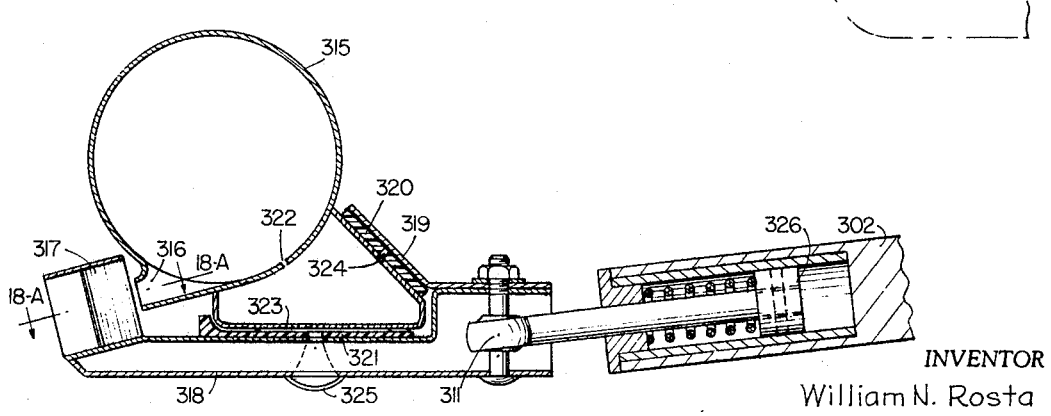
FIG. 18

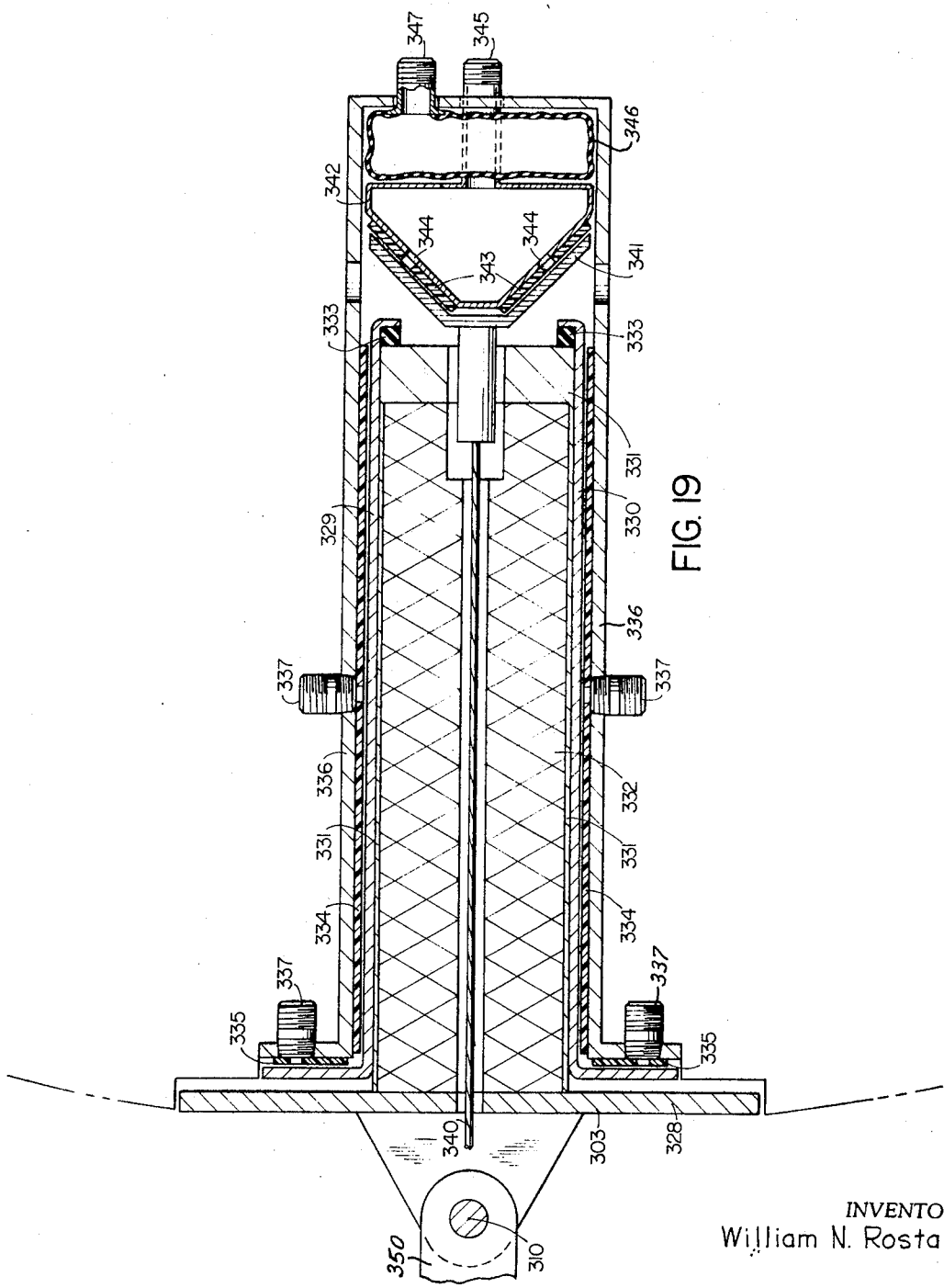

April 21, 1970 W. N. ROSTA 3,507,461
ROTARY WING AIRCRAFT
Filed June 16, 1967 10 Sheets-Sheet 10
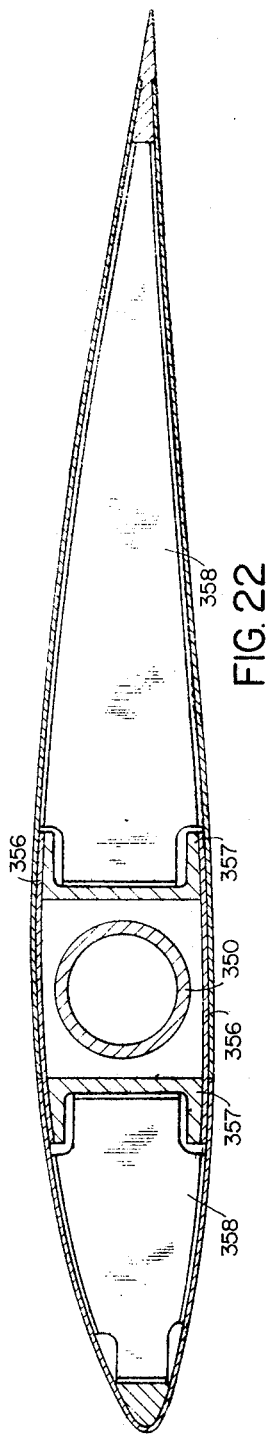
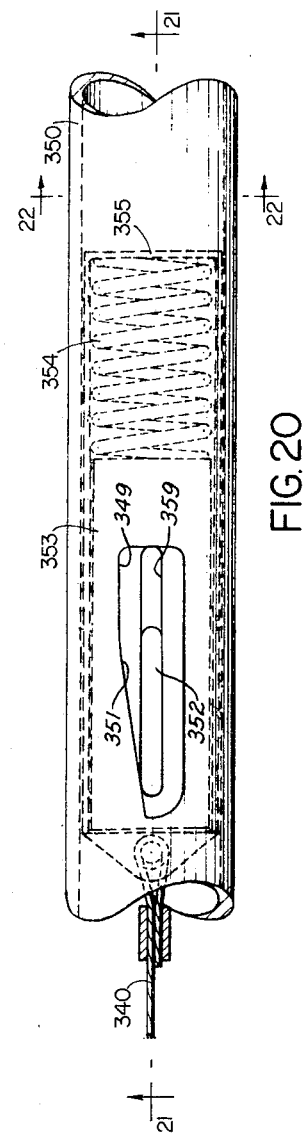
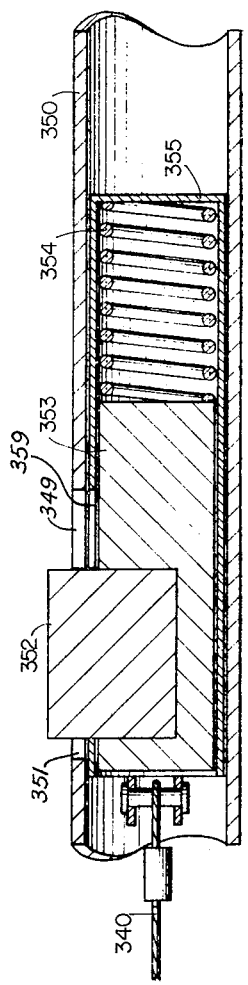
INVENTOR
William N. Rosta
BY
ATTORNEY

United States Patent Office 3,507,461
Patented Apr. 21, 1970

3,507,461
ROTARY WING AIRCRAFT
William N. Rosta, Corpus Christi, Tex., assignor to The VLM Corporation, Fort Worth, Tex., a corporation of Delaware
Continuation-in-part of application Ser. No. 564,801, July 13, 1966. This application June 16, 1967, Ser. No. 646,598
Int. Cl. B64c 27/20, 27/46, 27/54
U.S. Cl. 244—17.23                    18 Claims

ABSTRACT OF THE DISCLOSURE

This application discloses an improved rotary wing aircraft capable of vertical lift. The aircraft employs airfoils or rotor blades which rotate in tracks surrounding the fuselage with the airfoils being driven by pressurized air directed through nozzles onto turbine blades in the outer track. Directional control is provided by tilting the plane of rotation of the rotor blades or by cyclic pitch control of the rotors.

---

This application is a continuation-in-part of my co-pending application Ser. No. 564,801, filed July 13, 1966 now abandoned, for Rotary Wing Aircraft.

Although many different configurations have been proposed for a vertical lift aircraft, the only type that has to date been accorded any degree of acceptance is the helicopter. The helicopter is normally provided with four airfoils which are positioned in a generally horizontal plane and are driven to produce vertical lift. These airfoils are generally quite long and must be balanced with a high degree of accuracy. Further, it is necessary that the airfoils be capable of rotation on their own longitudinal axis in order to compensate for the difference of air pressure on opposite blades of the propeller when in horizontal motion. Since the blades of the helicopter are usually relatively long and a substantial portion of the lifting force is accomplished by the portion of the airfoil nearest the ends of the blade, substantial forces are created on the hub to which the airfoils are connected, further increasing the difficulty in mounting the airfoils to the rotating hub in such a manner as they can be pivoted to accomplish the necessary feathering action. The drive mechanism for such blades is therefore extremely complicated and expensive and usually quite heavy.

The torque created as the main lifting blades turn creates a tendency for the body of the helicopter to turn in an opposite direction. Accordingly, it is necessary in helicopters that a tail boom be provided to which a smaller propeller is affixed for creating a thrust to counteract the tendency of the body to turn. As a result of this construction, the helicopter has a definitely established direction of forward movement and it is necessary for the helicopter to turn through a relatively wide arc if the direction of travel is to be changed. A helicopter does not therefore possess the degree of maneuverability desired in many instances. In general, the power required to drive a helicopter is much greater than that required for more conventional aircraft with the same or even greater load carrying capacity and speed capabilities, further increasing the cost.

The present invention provides an improved vertical lift machine in which the airfoils move in a path defined by two concentric, oppositely disposed members. Further, in accordance with the principles of the present invention, the airfoils are driven by pneumatic means similar in many respects to a conventional turbine. In view of this unique construction, the necessity for a complicated driving mechanism for the airfoils is eliminated. The body of the vehicle is suitably a sphere with the members mounted in a substantially horizontal plane passing through the major diameter of this sphere. The airfoils can therefore be made relatively short as compared to a conventional helicopter but yet the radius traversed by the airfoil and, accordingly, the lifting capacity of the air foil is comparable to that of the longer helicopter airfoils. A cyclic pitch control for the airfoils may be provided for directional control. Alternatively, the lifting mechanism may be suitably connected to the body of the aircraft in such a manner that the plane in which the lifting mechanism lies can be varied to create the horizontal thrust in any desired direction, making it feasible for the aircraft to move horizontally in any direction without the necessity for turning in the manner required of a helicopter or conventional aircraft.

In accordance with one embodiment of the present invention, a fixed or rigid outer track may be used, and directional control is provided by tilting the tracks. To this end, there are provided first and second concentric tracks which are connected together into a unitary structure. There is also provided first and second ring structures which move in the first and second tracks, respectively. The airfoils are connected at each end to the first and second rings, suitably in such a manner that the angle of attack of the airfoils can be varied. The rings and airfoils therefore define a second unitary structure. The lifting mechanism comprising the first and second unitary structures is connected to the body of the aircraft, which is suitably of spherical configuration, by elements which can be operated to cause the angle of the plane passing through the lifting mechanism to a horizontal plane passing through the body to be varied as desired to cause horizontal thrust to be produced in any desired direction. In accordance with the preferred embodiment of the invention, eight pneumatic cylinders are utilized for this purpose, there being four of the cylinders connected to the upper surface of the inner track and four other cylinders connected to the lower surface of the inner track in opposing relationship to the four upper cylinders. It will be noted, however, that three or more such cylinders or other mounting means could be used in practicing the invention, although the controls are simplified by the utilization of four such cylinders. Further, in accordance with the preferred embodiment of the invention, the outer ring is provided with a plurality of blades which move within the outer track. These blades can be of many different configurations but are suitably shaped similar to that used in conventional turbines. There is also provided means for applying fluids under pressure against these blades to produce rotation of the unitary structure comprising the inner and outer rings and the airfoils connected thereto in the inner and outer tracks. In accordance with the preferred example of the invention, air under the necessary pressure is utilized for driving the second unitary structure in a manner similar to that in which a turbine is driven. However, it will be noted that other fluids, such as heated gases or steam, can be utilized.

In accordance with another embodiment of the invention, a rotary wing aircraft is provided in which the rotor blades or foils are permitted to "cone" rather than being fixed. This permits the structure supporting the outer track to be less rigid as it does not have to hold the rotor blades in a fixed position. Also, this embodiment uses cyclic pitch control for directional control rather than tilting the plane of rotation of the blades. A collective pitch control to provide constant rotor speed may be combined with the cyclic pitch control. The nozzle angle for the turbine drive in the outer track may be such that the counter rotation problem is obviated.

Many objects and advantages of the invention will become readily apparent to those skilled in the art as a detailed description of various embodiments of the invention unfolds, when taken in conjunction with the appended drawings wherein like reference numerals denote like parts and in which:

FIGURE 4 is a cross sectional view taken along line 4—4 of FIGURE 2;

FIGURE 5 is a cross sectional view taken along line 5—5 of FIGURE 2;

FIGURE 6 is a cross sectional view taken along line 6—6 of FIGURE 2;

FIGURE 15 is an elevational view, partly in section, of a rotary wing aircraft in accordance with another embodiment of the invention;

FIGURE 16 is a plan view of the aircraft of FIGURE 15;

FIGURE 17 is an enlarged elevational view in section, of the strut and rotor blade assembly for the aircraft of FIGURES 15–16;

FIGURE 18 is an enlarged sectional view of the outer track assembly, taken along along the line 18—18 in FIGURE 16;

FIGURE 18A is a sectional view taken along the line 18A—18A in FIGURE 18;

FIGURE 19 is a sectional view of the inner track and bearing assembly for the aircraft of FIGURES 15 and 16;

FIGURE 20 is a top view of the pitch control mechanism in one of the rotor blades for the aircraft of FIGURES 15 and 16;

FIGURE 21 is an elevational view in section, of the device of FIGURE 20, taken along the line 21—21 in FIGURE 20;

FIGURE 22 is an elevational view in section of one of the rotor blades in the aircraft of FIGURES 15 and 16 taken along the 22—22 in FIGURE 20.

Figure 1:
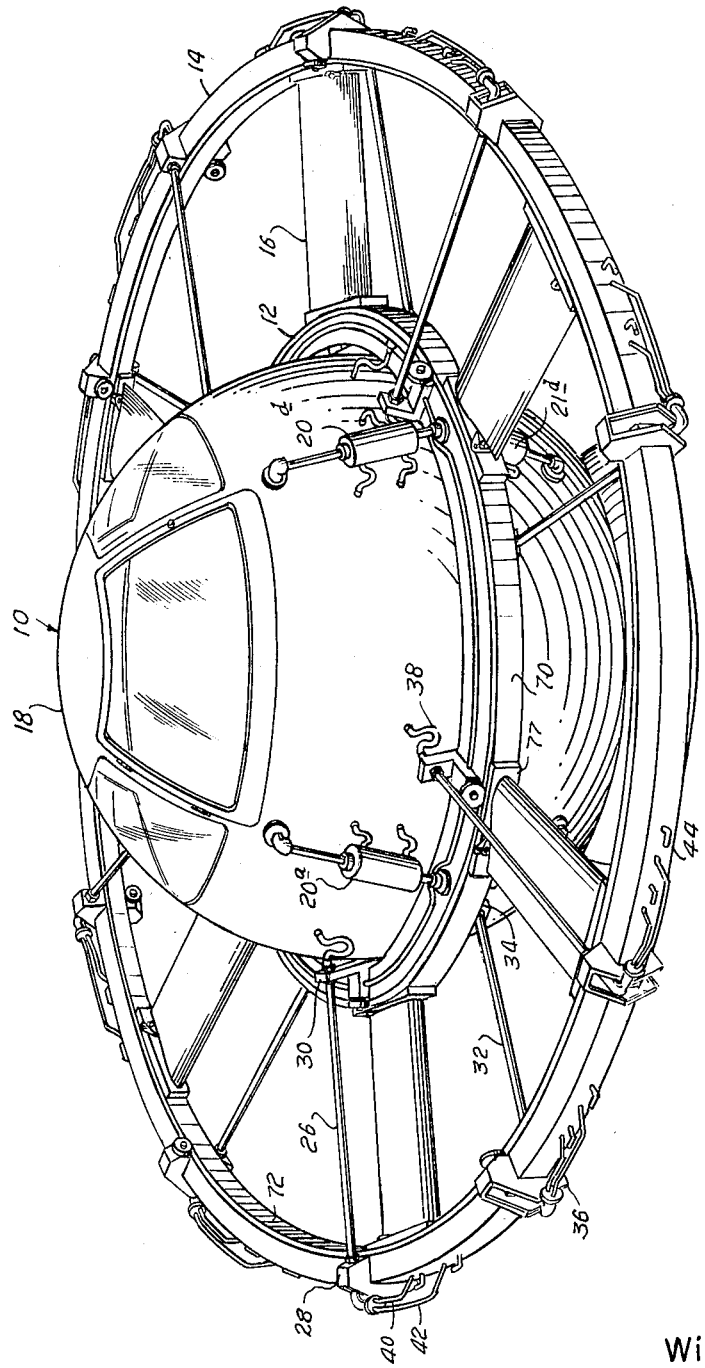
FIGURE 1 is a perspective view of a rotary wing aircraft in accordance with one embodiment of the present invention.

Turning now to FIGURE 1 of the drawings, there is shown a perspective view of a vertical lift machine in accordance with one embodiment of the present invention, designated generally by the reference character 10. The machine 10 can be seen to comprise an inner track 12 and an outer track 14 positioned in spaced apart relationship. The tracks 12 and 14 are concentric and oppositely disposed. A plurality of airfoils 16 move in a path defined by the tracks 12 and 14. The airfoils 16 are driven about the path defined by tracks 12 and 14 pneumatically. There is also provided a body 18 which suitably encloses the passengers and equipment associated with the machine. The body 18 is suitably connected to the inner track 12 by a plurality of pneumatic cylinders. There is suitably provided eight of the pneumatic cylinders. Four of the cylinders 20a–20d are positioned on the upper side of the track 12 on 90° spacings, the remaining four cylinders 21a–21d being attached to the under side of the track 12 in opposed relationship to those connected to the upper side. By controlling the pneumatic cylinders 20 and 21 it is possible to control the angle of the plane defined by the tracks 12 and 14 relative to a horizontally disposed plane passing through a diameter of the spherical body 18. In operation of the machine, if the cylinders 20 and 21 are adjusted such that the plane defined by the tracks 12 and 14 is co-planar with the horizontally disposed plane of the spherical body 18, lateral thrust will not be provided and the apparatus will move substantially vertically. By controlling the cylinders 20 and 21 such that the plane defined by the tracks 12 and 14 is inclined, the apparatus will be driven through the air in the direction of the inclination. Thus, by controlling the direction of inclination of the plane defined by the tracks 12 and 14 and the amount of inclination, it is possible to control the direction of movement of the aircraft. It will be appreciated that the machine is completely symmetrical and that the direction in which the pilot faces is arbitrarily considered the front of the aircraft. However, due to the unique configuration, it will be possible for the aircraft to move in any desired direction.

Figure 2:
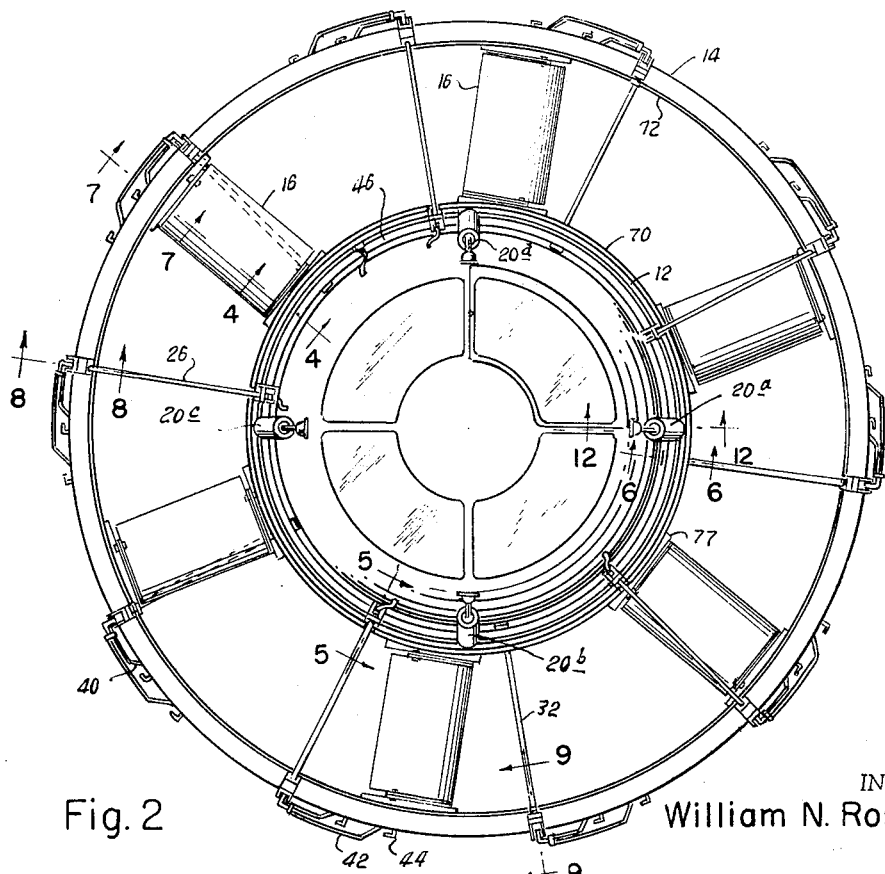
FIGURE 2 is a plan view of an aircraft of FIGURE 1 in accordance with one embodiment of the present invention.

There is also provided a plurality of tubular members 26 which extend between brackets 28 and 30. It can be seen that the brackets 30 are attached to the upper surface of the inner track 12 and brackets 28 are attached to the upper surface of the outer track 14. Similarly, there is provided a plurality of tubular members 32 which extend between brackets 34 attached to the lower surface of the inner track 12 and brackets 36 attached to the lower surface of the outer track 14. As best seen with reference to FIGURE 2, in accordance with the preferred embodiment of the invention, there is provided five of the tubular members 26 and five of the tubular members 32. Members 26 and 32 are arranged symmetrically such that the spacing between each of the members 26 is 72°, the spacing between each of the members 32 is 72° and the spacing between members 26 and 32 is 36°. On the other hand, it can be seen that in accordance with a preferred embodiment of the invention there is provided six of the airfoils 16. Only one of the tubular members 26 will ever be positioned directly over one of the airfoils, minimizing disruption in the laminar flow or the air over the airfoil surfaces. Thus, as shown in FIGURE 2, one of the tubular members 26 will begin to pass over one of the airfoils 16 as another one of the tubular members leaves the surface of the airfoil. Similarly, substantially only one of the lower tubular members 32 will be in a position to disrupt the flow of air over an airfoil for the same reasons, also as illustrated in FIGURE 2. It will also be noted that the flow of air over the airfoil surfaces is affected on oppositely disposed ones of the airfoils, minimizing any disruption in the over-all lift characteristics. It will be appreciated, however, that both the number of airfoils and the number of tubular members can be different from that shown and described.

One end of each of the tubular members 26 is connected by means, suitably a flexible hose 38, to a supply of air under pressure. The opposite end of each tubular member 26 is connected through lines 40 and 42 to orifices directed to the interior of outer track 14.

As will be described in greater detail as the description of the invention unfolds, there is positioned within the outer track an annular member having a plurality of turbine type blades mounted on its outer periphery. The air discharged from the orifices connected to lines 40 and 42 impinges upon the turbine blades causing movement of the air foils 16. There is also provided exhaust nozzles 44 associated with each of lines 40 and 42 which provides an exhaust passage for the air used for driving the air foils. The exhaust nozzles are suitably adjustable such that the stream of air discharged from each of the exhaust nozzles can be used for the purpose of creating counteracting torque in opposition or other external forces generated in the course of flight. By controlling the direction in which the exhaust nozzles 44 face, it is possible to use the exhaust streams for the purpose of controlling rotation of the apparatus. Thus, it is possible to permit rotation of the apparatus to change the orientation thereof and also to prevent rotation during straight flight. There is also shown in FIGURES 1 and 2 a pneumatic header of circular configuration, designated by the reference character 46 which functions to supply the air to a pneumatic bearing utilized in conjunction with the inner track 12 in accordance with the preferred embodiment of the invention.

Figure 3:
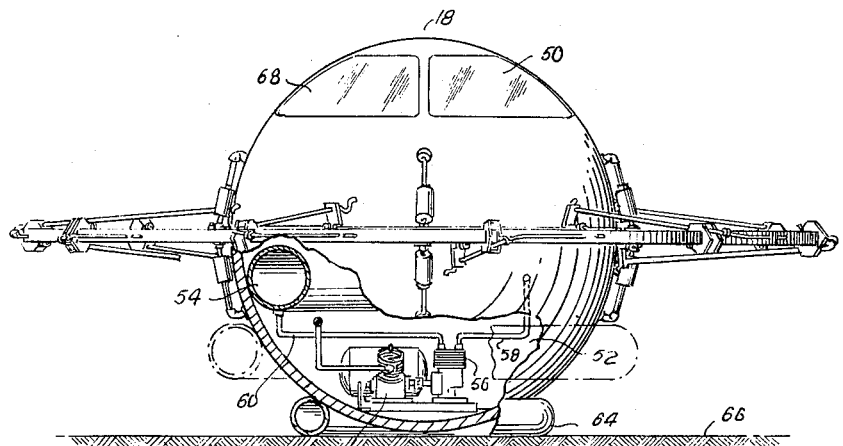
FIGURE 3 is a side elevational view of an aircraft of FIGURES 1 and 2 in accordance with one embodiment of the present invention.

As best shown in FIGURE 3 of the drawings, the body 18 of the apparatus is suitably of spherical configuration and which is divided into an upper passenger compartment 50 and a lower machinery compartment 52. Positioned within the machinery compartment 52 is an annular air reservoir 54 which is suitably of circular cross section for maximum structural strength. Air is pumped into the reservoir 54, suitably from a pump 56 having its inlet connected to the atmospheric pressure through line 58 and its outlet connected by line 60 to the reservoir 54. The pump 56 is suitably driven by motor 62 which can be a conventional gasoline powered motor.

Positioned around the lower end of the body 18 is a resilient member 64 which supports the vehicle when landed. The member 64 is suitably a pneumatic member of circular cross section filled with air to the necessary pressure to support the vehicle but yet provide the necessary cushioning effect. Further, the members 64 can be sufficiently large to provide the necessary buoyancy for operation from water landing sites. It is preferred, however, that for water landings a supplemental member similar in form to member 64 will be positioned in a plane above that of member 64 but below the lifting mechanism for greater stability in the water and that additional buoyant member or members be provided about the periphery of the lifting mechanism. An airline, not shown in FIGURE 3, is suitably provided for permitting pressure into the volume enclosed by the bottom of the body 18, the member 64, and the surface 66 upon which the apparatus rests for the purpose of breaking any vacuum which may be created during lift off, particularly from water. Further, by creating a relatively low pressure level within the volume described, a ground effect is created which makes it possible to easily move a vehicle along a surface without the necessity for wheels.

The passenger compartment 50 is provided with windows 68 through which the pilot and passengers can look out and necessary seats and control panels and cargo gear, none of which are shown.

An inner supporting ring 70 and an outer supporting ring 72 are provided in accordance with the preferred embodiment of the invention. The air foils 16 are supported between the ring members 70 and 72 with the inner ring 70 being engageable with the inner track 12 and the outer ring 72 being engageable with the outer track 14. The constructional details of the inner track 12 and the bracket members 30 and 34 associated therewith are shown in FIGURES 4, 5 and 6 of the drawings. Thus, it can be seen that the inner ring 12 is suitably of a U-shaped configuration in cross section defining a groove 74 in which a rim portion 76 of the inner ring 70 moves. Positioned about the periphery of the inner ring 12 are a plurality of bearing members 76 which engage the surface 78 of the inner ring 70 for the purpose of centering the inner ring 70 with respect to the inner track 12. In accordance with the specific example of the invention, five of the bearing members 76 were provided. Also, as shown in FIGURE 4, there is provided a plurality of passageways in the inner ring 12 wherein communication is provided between the manifold 46 and the groove portion 74 of the inner ring 12. Air pressure provided in the groove 72 as a result of flow of air from the manifold provides the function of a bearing which prevents intimate contact between the surfaces of the rim portion 76 of the ring 70 and the groove portion 74 of the inner track. Each of the airfoils 16 is suitably connected at one end to a mounting block 77, suitably by a pin 80 whereby the angle of the attack of the airfoil 16 may be varied. The support or bracket members 30 and 34 are shown in FIGURES 5 and 6 of the drawings, and the similarity between the two will become readily apparent, the principal difference being the difference in orientation. Each of the bracket members 30 and 34 can be seen to comprise a pair of leg members 90 and 92 adapted to lie over and be connected to the surfaces of the inner ring 12 and having a body portion 94 extending away from the inner track 12. An opening 96 is provided in the end of the body portion 94 through which the tubular members 26 and 32, respectively, pass. Each of the bracket members 30 and 34 suitably carries a bearing 100 and 98, respectively, which cooperate for vertical positioning of the ring 70 and which bear upon surfaces 104 and 102 of the ring 70, respectively. The bearings 76, 98 and 100, in conjunction with the bearing effect produced by air from the manifold 46, cooperate to define a path in which the inner ring 70 moves.

Figure 7:
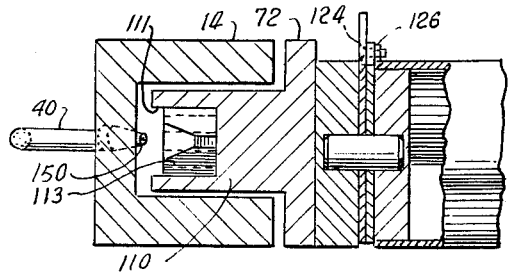
FIGURE 7 is a cross sectional view taken along line 7—7 of FIGURE 2.
Figure 8:
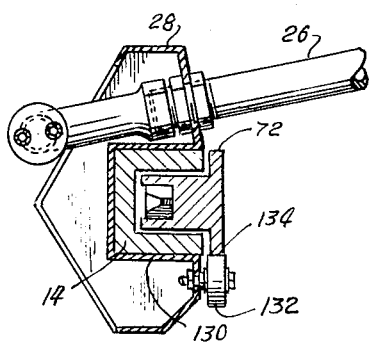
FIGURE 8 is a cross sectional view taken along line 8—8 of FIGURE 2.
Figure 10:
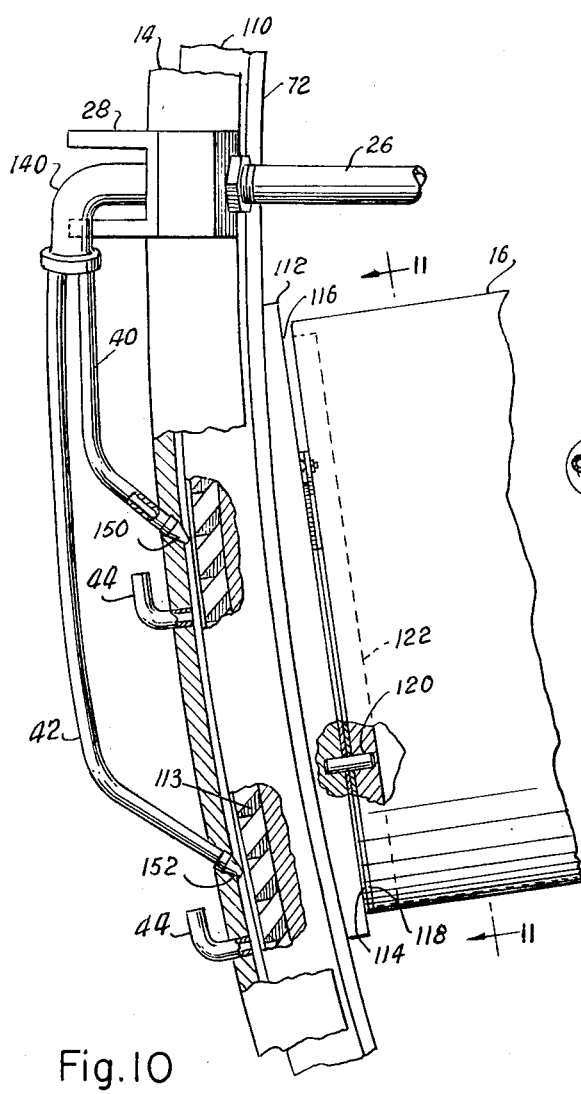
FIGURE 10 is a plan view, partially in cross section, of a portion of the outer ring and outer track utilized in accordance with the embodiment of the invention as in FIGURES 1–9.
Figure 12:
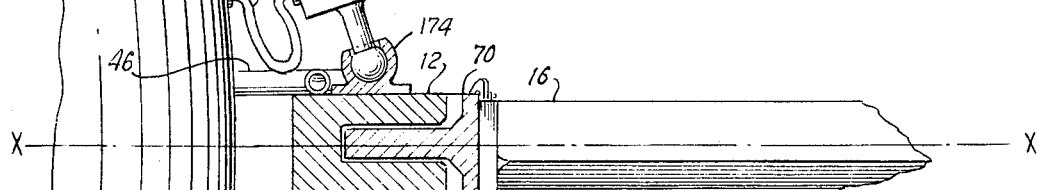
FIGURE 12 is a view taken along line 12—12 of FIGURE 2.
Figure 11:
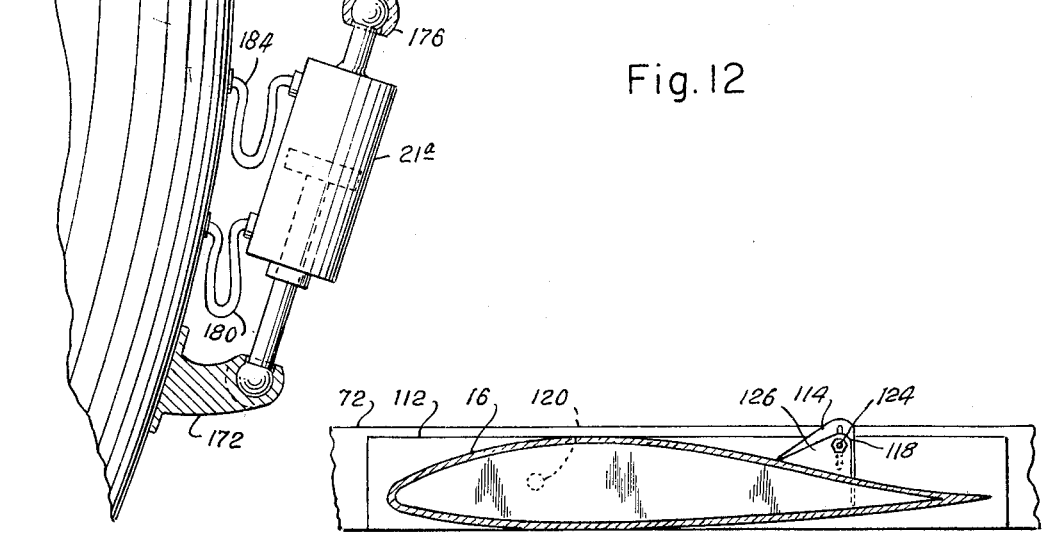
FIGURE 11 is a view taken along line 11—11 of FIGURE 10.

The outer track 14 and the outer ring 72 are shown in greater detail in FIGURES 7, 8 and 10 of the drawings. Thus, it can be seen that the outer track 14 is also of U-shaped configuration in cross section adapted to receive the rim portion 110 of the outer ring 72. The outer edge of the rim 110 is shaped to define an annular groove 111 within which are fitted a plurality of blades 113. In a manner similar to that described with respect to the inner ring, at each point to which one of the airfoils 16 is to be attached to the outer ring 72, there is provided a mounting block 112 having a plate 114 mounted onto the surface 116. Similarly, the end of the airfoil 16 to be attached to the outer ring 72 is provided with a plate 118. The actual connection between the air foils 16 and the mounting block 12 is by means of a pin 120 which engages both the mounting block 116 and the end structural member 122 of the airfoils 16. Air foils are therefore pivotally connected to the mounting block 112 carried by the outer ring 72. The angle of attack of the airfoil 16 can be controlled by the relationship between the plates 114 and 118, as best shown in FIGURE 12 of the drawings. Thus, one of the plates 114 and 118 is suitably slotted such that the angle of attack can be varied but positioned at a desired angle by tightening the screw 124 and nut 126.

Figure 9:
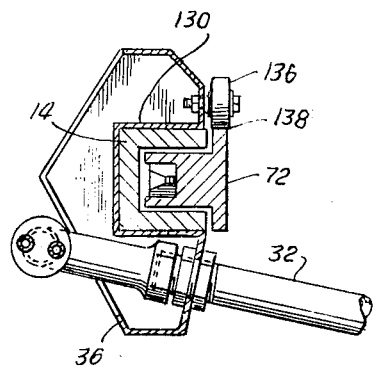
FIGURE 9 is a cross sectional view taken along line 9—9 of FIGURE 2.

As best shown in FIGURES 8 and 9, the mounting brackets 28 and 36 are of similar construction and each shaped to define a channel portion 130 which fits over the outer track 14. Further, each of the mounting brackets 28 and 36 are adapted to receive and be connected to the tubular members 26 and 32, respectively, for the purpose of supporting the outer tarck 14 in concentric, opposed relationship to the inner track 12. The bracket member 28 carries a bearing 132 which engages the lower surface 134 of the outer ring 72. Similarly, the bracket members 36 each carry a bearing member 136 which is engageable with the surface 138 of the outer track 72. The bearings 132 and 136 cooperate to maintain the vertical position of the outer ring 72 relative to the outer track 14. It is to be noted that bearing members 76 associated with the inner track 12 position both the inner ring 70 and the outer ring 72 insofar as horizontal movement is concerned.

There is shown in greater detail in FIGURE 10 of the drawings the operative relationship between the outer ring 72 and the outer track 14 and the associated parts.

Thus, it can be seen that tubing members 40 and 42 are connected at one end to the fitting 140 which in turn is connected to one of the tubular members 26, as shown, or the tubular member 32.

Tubing members 40 and 42 are each suitably provided with nozzles 150 and 152, respectively. Nozzles 150 and 152 are each positioned such that a stream of fluids flowing outwardly therefrom will impinge directly upon the face of the blades 114 in order that the maximum amount of force may be created. It can therefore be seen that the drive mechanism of the aircraft, in accordance with the present invention, is essentially that of a turbine. Accordingly, many different types of fluids, such as hot gases or steam, can be utilized in practice of the invention wherein the blade configuration and positioning can be varied in many ways similar to that of more conventional turbines. Also, the position of the nozzles can be varied, as, for example, directing the stream of gases in a substantially vertical plane.

It will be appreciated that the lifting mechanism can be carried by and driven from the inner ring 70 and driven through the inner track 12, in which event the outer track 14 and outer ring 72 could be dispensed with. However, even through the lifting mechanism does not actually contact the outer track 14 it would remain desirable from the safety standpoint in that it would minimize the possibility of the rotating air foils striking a person or other object. The driving mechanism shown is preferred, however, in that a decided mechanical advantage is obtained by driving the airfoils from the outer track rather than the inner track.

As mentioned previously with respect to FIGURES 1, 2 and 3 of the drawings, the direction of flight is controlled by actuation of the air cylinders 20 and 21 which cooperate to control the attitude of the unitary structure defining the drive system. Thus, as shown in FIGURE 12 of the drawings, the drive system will normally be positioned in a horizontal plane X—X. The plane X—X passes through the center of the inner track 12, inner ring 70, the airfoils 16, the outer track 72, and the outer ring 14. This attitude is maintained by the pneumatic cylinders 20a and 21a, shown in FIG. 12. It can be seen that each of the cylinders is connected at one end to body 18 by mounting brackets 170 to 172, respectively, the outer ends of cylinders 20a and 20b are connected to the inner track 12 by mounting brackets 172 and 176, respectively. It can be seen that the brackets 170, 172, 174 and 176 are shaped to provide a ball joint connection between the cylinders 20a and 21a, the body 18 and the inner track 12. Tilting of the driving assembly in any direction will therefore not affect orientation of the cylinders.

Figure 13:
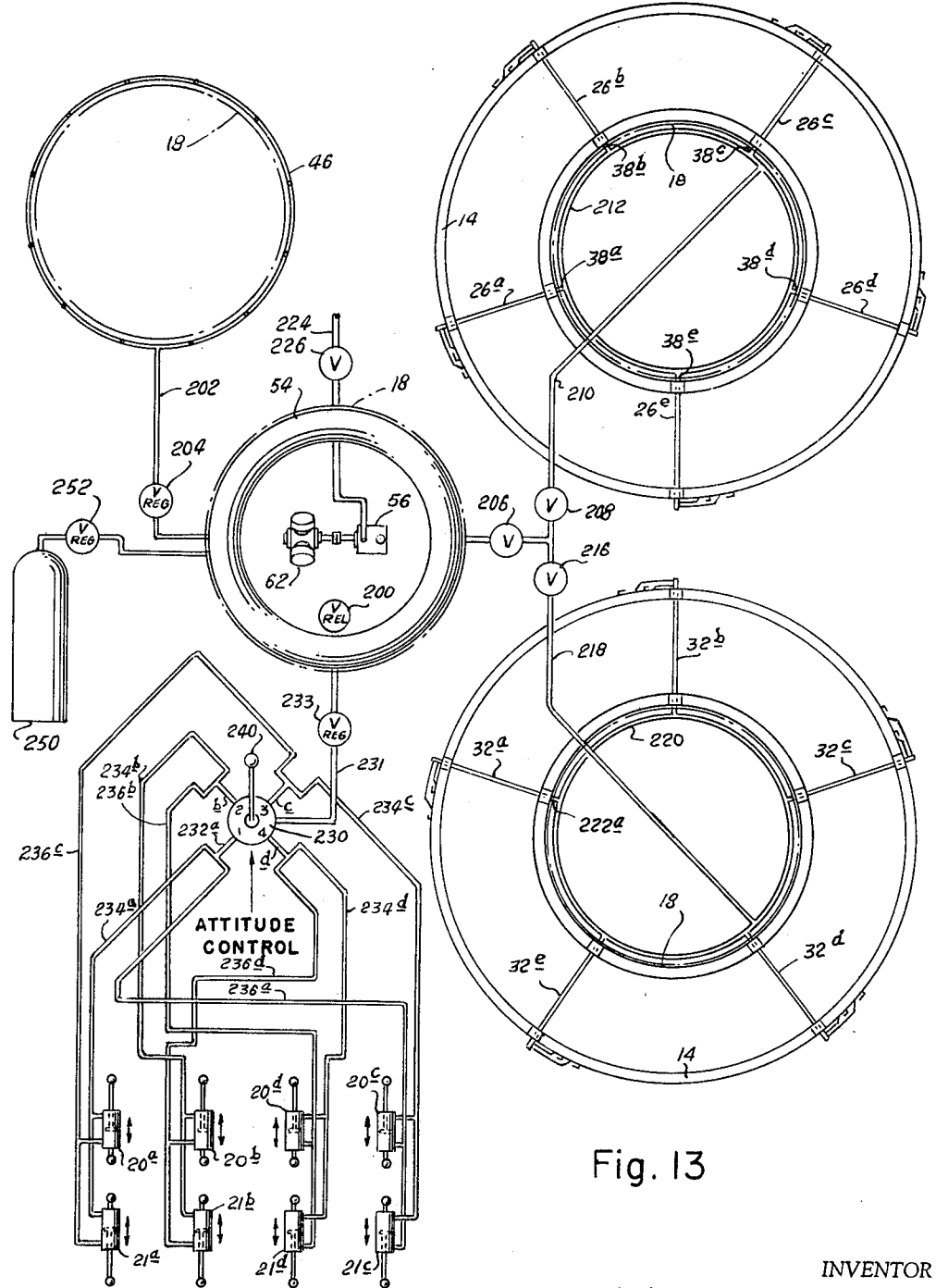
FIGURE 13 is a view schematically illustrating a pneumatic system utilized in accordance with the embodiment of the invention as in FIGURES 1–12.

Turning now to FIGURE 13 of the drawings, a control system suitable for use in practicing the invention is shown. It can be seen that in accordance with the preferred example of the invention, the propulsion of the aircraft as well as the controls are handled pneumatically. Thus, there is provided a motor 62 which drives a compressor 56 for the purpose of filling reservoir 54 with air under pressure. There is also suitably provided a release valve 200 which functions to shut the motor off whenever the pressure within the tank 54 obtains a desired maximum level and also for releasing air in the event the pressure within the tank should become undesirably high. The tank 54 is connected through line 202 to the air bearing manifold 46 which controls the flow of air into the inner track 12. Regulating valve 204 controls the pressure of air admitted into the air bearing to be at a desired level even though the pressure in the tank may be much higher.

Tank 54 is also connected through valve 206, valve 208 and line 210 to a manifold 212 suitably positioned within a body 18. Manifold 212 is connected by flexible hose members 38a–38e to the tubular members 26a–26e, respectively. Valve 206 is also connected through valve 216 and line 218 to manifold 220. Manifold 220 is also suitably positioned within the body 18. Manifold 220 is connected through flexible members 222a–222e, respectively, to the tubular members 32a–32e, respectively. When valves 208 and 216 are each open, the flow of fluids from the tank 54 to the outer track 14 will be through both the tubing members 26 and 32, each supplying substantially equal amounts of fluid. The speed at which the airfoil is driven can therefore be controlled by controlling the opening of the valve 206 with maximum power being available. If only half power is required or less than half power, one of the valves 208 or 216 can be closed and fluids will be applied to the drive turbine through only half of the available ports.

There is also provided line 224 which is opened at one end and connected by its other end through valve 226 to the reservoir 54. The open end of line 224 communicates with the space enclosed by the member 64 and the lower surface of body 18. When air pressure is admitted into the space through line 224 and valve 226, pressure is created which tends to lift the vehicle 10 from the ground, making it easy to move the vehicle along the surface and also preventing any possibility of a vacuum being created that would increase the difficulty of lift off.

Control of cylinders 20a–20d and 21a–21d is obtained by a valve 230 having an inlet connected through Line 231 and a regulated valve 233 to the reservoir 54. Valve 230 is provided with four outlet lines 232a–232d. The cylinders 20 and 21 are double-acting cylinders; and, therefore, a port which functions as an inlet port for one direction of actuation, functions as an exhaust port for the other direction of actuation. For purposes of the following description, however, the inlet ports of the respective cylinders are those ports which serve to direct fluid to extend the cylinder, while the exhaust ports are those ports which serve to direct fluid to contract the cylinder. The valve outlet line 32a is connected through line 234a to the exhaust port of cylinder 20a and the inlet port of cylinder 21a, and through line 236a to the inlet port of cylinder 20c and the exhaust port of cylinder 21c. Similarly, that line 232c is connected through line 234c to the exhaust port of cylinder 20c and to the inlet port of cylinder 21c and through line 236c to the inlet port of cylinder port 20a and to the exhaust port of cylinder 21a. Similarly, valve outlet line 232b is connected through line 234b to the exhaust port of cylinder 20b and to the inlet port of cylinder 21b, and through line 236b to the inlet port of cylinder 20d and the exhaust port of cylinder 21d. The valve outlet line 232d is connected through line 234d to the exhaust port of cylinder 20d and to the inlet port of cylinder 21d, and through the line 236b to the inlet port of cylinder 20b and to the exhaust port of cylinder 21b.

Figure 14:
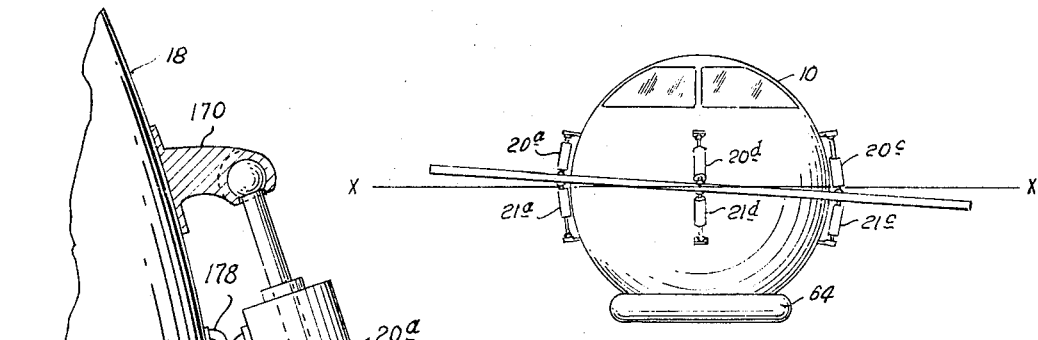
FIGURE 14 is an elevational view illustrating the manner in which horizontal motion of the aircraft can be accomplished in the embodiment of FIGURES 1–13.

The valve 230 is ported such that when the control 240 is in the neutral position, pressure will not be applied from line 231 to any of the output ports or lines 232a–232d. On the other hand, if the control 240 is placed in position 1, pressure will be applied through lines 234a and 236a to the inlet of cylinders 21a and the exhaust of cylinder 20a and to the exhaust of cylinder 21c and to the inlet of cylinder 20c. Thus, when control 240 is moved into position 1, cylinder 21a will be extended and cylinder 20a contracted, causing the portion of the inner track 12 connected to cylinders 20a and 21a to be forced upward with respect to the horizontal plane X—X, shown in FIGURE 14. Simultaneously, cylinder 20c will be extended and cylinder 21c contracted, causing the portion of the track 12 connected to these cylinders to move downward with respect to the plane X—X. As a result of these actions, orientation of the driving apparatus will be disorientated from the plane X—X as shown in FIGURE 14, causing the apparatus to move in the direction of cylinders 20c and 21c. Conversely, if the control 240 is placed in position 3, opposite results will be obtained, resulting in the driving apparatus being tilted from the horizontal plane X—X and the aircraft will move in the direction of cylinders 20a and 21a. Also, in similar fashion, if the control 240 is placed in position 2, the aircraft will move in the direction of cylinders 20d and 21d, and if placed in position 4, the aircraft will move in the direction of cylinders 20b and 21b. If the control is placed in position intermediate to positions 1 and 2, pressure will be applied to all of lines 234a, 234b, 236a and 236b, resulting in tilting of the drive mechanism in a direction intermediate cylinders 20c and 20d providing a resultant direction of travel. Thus, any desired direction of movement can be obtained.

It will be appreciated that an important safety factor is provided in the embodiment of the invention disclosed since if the motor 62 or compressor 56 should fail, the supply of air within the reservoir 54 will maintain rotation of the air foils for a substantial period of time. Further, there can be provided one or more cylinders 250 of gas under high pressure that are connected through regulating valve 252 to the reservoir 54. In the event of the failure of the motor and compressor, valve 252 can be operated to admit gas into the reservoir 54 from the cylinder 250, with the cylinder 250 providing an emergency supply of gas under pressure.

It can be seen from the foregoing description that the apparatus of the present invention provides many advantages. Thus, the motor and compressor can be operated at all times at optimum speeds, the control of the aircraft being accomplished through a control of the gases applied to drive the rotor blades. The pneumatic system disclosed in accordance with the preferred embodiment of the invention is extremely reliable and characterized by a high degree of simplicity. Important safety features are obtained through the use of the pneumatic driving system. The apparatus provided by the present invention is readily adaptable for both land and sea operation. Further, an additional safety factor can easily be provided in that the lifting mechanism can be attached to the body in such a fashion to permit quick disconnection thereof in the event the supply of air is exhausted, and a parachute which is only required to support the weight of the body of the aircraft can be provided.

The apparatus provided by the present invention is also characterized by a high degree of maneuverability. Thus, when in the hovering position, by controlling the orientation of the exhaust nozzles 44, the aircraft can be permitted to rotate such that the pilot will be facing in any desired direction without the necessity for horizontal movement of the aircraft. The aircraft is, in addition, capable of vertical ascent and descent and by controlling the plane of the lifting mechanism, horizontal movement in any desired direction can be obtained without necessity for reorientation.

In another embodiment of the invention, the airfoils are not maintained in a fixed horizontal position but instead are permitted to flex, and also cyclic pitch control is used rather than the directional control illustrated above. Other features of this embodiment will be apparent from the following detailed description.

With reference now to FIGURES 15 and 16, elevation and top views of a rotary wing aircraft according to the second embodiment of the invention are illustrated. This aircraft 300 includes a fuselage 301 along with a plurality of rotor blades 302, in this case five rotor blades, which rotate about the periphery of the fuselage in a path as defined by an inner track 303 and an outer track assembly 304. The rotor blades 302 are driven by pressurized air or gas directed at turbine blades within the outer track assembly 304 in a manner similar to the embodiment discussed above, as will be described in detail below. The pressurized air or gas is delivered to the outer track by a plurality of struts 305 which are hollow and define ducts. Located within the fuselage 301 is a power plant in the form of a gas turbine of conventional form, driving a low pressure, high volume air compressor. Although this aircraft may be constructed in various sizes, it may be noted that for the particular embodiment as will be described, a gas turbine engine of 370 shaft horsepower and air compressor producing about 6,000 cubic feet per minute would be suitable. The engine and compressor would be mounted in the lower part of the fuselage 301 as indicated generally by dotted lines in FIGURE 15. In the central part of the fuselage will be located seats for the occupants, and an instrument panel 307 along with suitable controls. An important feature of the invention is the provision of a compartment 308 for a parachute as will be described later. Within the lower section of the fuselage is a landing gear cushion 309 which may be deployed as seen, or this may be permanently positioned on the lower side of the fuselage. Pressurized air may be directed out of the lower part of the fuselage from the compressor to produce a ground-effect type landing arrangement, or descent may be cushioned merely by the inflated cushion 309 itself.

With reference now to FIGURE 17, one of the rotor blades 302 and one of the struts 305 are shown in more detail, and the "coning" effect is illustrated. It is noted that when the rotor blades 302 are stationary or rotating very slowly, they will be in a lower position wherein the rotor blades extend down at a slight angle from the horizontal. However, as the speed of rotation of the rotor blades increases, lift will be produced which tends to raise the rotor blades. In contrast to the previous embodiment where the foils or rotors are maintained in a fixed position, the present embodiment permits the rotor assembly to flex upwardly or "cone" so that at high rotor speeds the assembly will have moved up to the position illustrated in dotted lines in FIGURE 17. This is similar in principle to the manner in which the rotor blades in a conventional helicopter are hinged at the hub and free to fold upward. The extent to which the rotor blades cone upward is limited not by the mechanical linkages but instead by the centrifugal force existing in the rotating assembly when turning at high speeds. This force tends to hold the blades toward a horizontal position and is balanced against the lift created by the aerodynamic cross-section. In this manner, the need for a structural assembly which will hold the blades in a fixed position is obviated, and the struts 305 along with the outer track need be only constructed to support their own weight when the vehicle is at rest, rather than being constructed to support a large part of the weight of the entire vehicle in flight. To permit coning of the rotor blade assembly, each blade 302 is pivoted at the point where it is connected to the inner track 303 by a hinge assembly 310. Likewise, the rotor blade 302 is hinged at the point where it joins the rotating part of the outer track 304 by a pivoting assembly 311. Likewise, the strut 305 is pivoted about a point 312 where it is joined to the fuselage and is pivoted about a point 313 where it engages the outer track. Since the length of the rotor blades 302 and struts 305 will vary relative to one other depending upon the degree of coning, the strut is permitted to adjust in length by a coupling 314 wherein concentric cylinders or tubes are permitted to slide relative to one another.

With reference now to FIGURE 18, a cross-sectional view of the outer track assembly is illustrated, with the outer housing being removed. The stationary portion of the outer track assembly includes a main manifold 315 which is a hollow tube encircling the entire aircraft, constructed perhaps of a suitable plastic, about three (3″) inches outside diameter. The struts 305 or air conduits are connected to this manifold 315 at their outer ends so that the low pressure air from the compressor within the fuselage is communicated to this manifold. Along its lower outside edge, the manifold 315 is shaped to define a plurality of turbine nozzles 316 which point almost directly radially outward, rather than at pronounced angle, and which are canted downward from the horizontal about 15° for example. This angle is selected to balance the reaction produced by the discharge of air from the nozzles against the weight of the outer track so that the outer track will "float." There would be about 250 of these nozzles or one about every four or five inches spaced around the periphery of the outer track of a vehicle of the size given in this example. Pressurized air from the nozzles 316 is directed against a plurality of turbine blades 317 which are part of the rotating portion of the outer track and are of course mechanically connected to the rotor blades to cause rotation thereof. The blades 317 would be spaced about the periphery of the track, perhaps about one or two inches apart, and since low temperature air or gas is used, and low velocities are involved, the turbine blades could be composed of a material such as plastic rather than the high temperature, high strength, metals usually used for turbine blades.

As will be seen in FIGURE 18A, the angle of the nozzle 316 is almost 90° with respect to the direction of rotation of the turbine blades in a tangential direction. Actually, the nozzles are preferably canted forward about 3°, for the purpose of exactly balancing the tendency for the entire vehicle to rotate in a direction opposite to that of the rotation of the rotor blades, as would occur if the nozzles were positioned at an angle pointed into the rotor blades in the direction of their rotation as would be used for maximum nozzle-to-blade efficiency in accordance with standard practice. However, to avoid the necessity of compensating for counter-rotation by other means, the nozzles are positioned to be directed almost straight outwardly, or about 3° therefrom, which is not at the maximum efficiency point but which avoids the counter-rotation problem. The turbine blades 317 are shaped to produce about 70° of gas deflection, that is, a 70° difference between a tangent to the leading edge and a tangent to the trailing edge. Calculated on the basis of a turbine blade velocity of 500 feet per second needed to rotate the rotor blades 302 at about 330 r.p.m., the exit velocity of air from the nozzles 316 would be about 1200 feet per second, thus requiring an output from the compressor on the order of about 6,000 cubic feet per minute of air for a gross vehicle weight of about one ton, or slightly over. This vehicle would have an over-all diameter of about 30 feet, a rotor blade length of about 9 feet, and an outside diameter of the cabin of about 10 feet. A useful load of about 1100 lbs. would be provided, thus a four place vehicle. Of course, this is merely an example of one size vehicle.

Air bearings are used between the stationary and rotating parts of the outer track is seen in FIGURE 18. The turbine blades 317 are all secured to a rotating track 318 which of course is secured to the five rotor blades 302 by the pivot assemblies 311. The rotating track 318 includes an upper bearing portion 319 whereby a bearing area 320 is defined along with a bearing area 322. Air is fed in from the main manifold 315 through a hole 321 into a bearing air manifold 323 which is a hollow ring extending all the way around the periphery of the vehicle. A series of holes 324 permit air to bleed into the bearing area 320 so that the moving part 319 does not touch the stationary part of the outer track but instead rides on a cushion of air. Air for the lower air bearing area 321 is provided by an air scoop 325 of which there are a large number spaced around the bottom of the rotating track 318. The air scoop 325 faces forward and thus upon rotation of the track 318 air is forced up through a conduit into a central part of the bearing area 321 so that when the rotor assembly is rotating at high speed an air bearing is provided. The air feed for the air bearing area 321 could be provided from the manifold 323 by holes, but this would of course dissipate more of the pressurized air from the main manifold whereas the air scoop arrangement produces the bearing air at very little increased drag. It is noted that at the outer end of the rotor blade 302 a spring loaded piston arrangement 326 is used to permit movement of the rotor blade in a radial direction with respect to the rotating track 318 as would occur upon coning or upon distortion of the rotor blades in rough air.

With reference now to FIGURE 19, the structure of the inner track 303 will be described in detail. FIGURE 19 is an elevational view in section of the inner track along with its bearing and pitch control assemblies. It is noted that each rotor blade 302 is connected through the pivot 310 to a rotating ring or plate 328 which encircles the entire fuselage and has the five rotor blades attached thereto. The ring 328 rotates with the rotor blades. Secured to the inside edge of the ring 328 is a bearing structure including an upper bearing plate 329 and a lower bearing plate 330, these being fixed to the ring 328 by a structure including inner solid plates 331 along with honeycomb material 332 to conserve weight while retaining structural rigidity. It is noted that the inner portion 331 may move slightly relative to the upper and lower plates 329 and 300 and are somewhat cushioned with respect thereto by rubber gaskets 333 between the inner part 331 and lips on the inside edges of the plates 329 and 330. The slight relative movement permitted by this assembly permits the main ring 328 and its associated parts to flex and distort slightly due to centrifugal force on the rotor blades which cause a slight out-of-round condition of the ring 328. With five of the rotor blades 302 the ring 328 will tend toward assuming a slight pentagon shaped figure although of course distortion will be actually very slight; however, it is noted that the bearing plates 329 and 330 may maintain an almost exact circular configuration due to the relative movement permitted by the rubber gaskets 333. Horizontal bearing pads 334 and vertical bearing pads 335, composed of plastic or the like, are supported by a stationary track 336, with feed lines 337 for bearing air leading into the spaces between the bearing plates and the bearing pads. The feed lines 337 are connected to the compressor of the main power plant, thus providing an air bearing system for the rotating part of the inner track.

A part of the pitch control arrangement for the rotor blades is also located in the inner track. A pitch control cable 340 extending from each rotor blade as will be described passes through the rotating ring 328 and inner core 332 to a pitch control ring 341 which of course rotates along with the rotating part of the inner track. The rotating control ring 341 may be caused to rotate about the same axis as that of the main ring 328, in which case there would be no cyclic pitch variation, or may be caused to rotate eccentrically with respect to the ring 328 in which case cyclic pitch will be introduced since the cables 340 going to the controls in the rotor blades will move in and out as the inner track rotates. The rotating cyclic control ring 341 bears upon a nonrotating cyclic pitch control ring 342 with plastic bearing pads 343 being provided along with bearing air inlets 344. Bearing air is introduced into the nonrotating ring 342 by an inlet 345 going to the compressor of the vehicle power plant so that an air bearing system is provided for the rotating and nonrotating pitch control rings 341 and 342. To provide cyclic pitch control, the position of the nonrotating ring 342 can be varied by means of four air bladders 346 spaced around the periphery of the inner end of the inner track assembly. By varying the relative air pressures in the four bladders 346, by means of suitable control at the control panel, the eccentricity of the pitch control ring 342, and thus the cyclic pitch, may be varied. A conduit 347 is connected from each one of the bladders 346 to the air valves in the control mechanism for this purpose. If equal pressure is maintained in each bladder, there will be no cyclic pitch variation.

Turning now to FIGURE 20, the outer end of the cable 340 is shown as it engages the pitch control mechanism located about midway along the length of one of the rotor blades 302. The pitch control mechanism is located within a hollow tube 350, about one inch diameter, which forms a fixed spar for the rotor blade or airfoil and which is connected to the pivot point 310 as shown in FIGURE 19. An aperture in the top of the tubular spar 350 defines a cam surface 351 against which rides a cam 352 as best seen in FIGURE 21. This cam 352 is connected to a collective pitch control weight 353 and these two members are spring biased by a spring 354 forcing the members inwardly from a cyclic pitch control cylinder 355. The cylinder 355 also acts as a weight and tends to be forced outward due to centrifugal force as the rotor blade rotates. Operation of this mechanism may be understood by noting that as the cam 352 moves to the right, the cam surface 351 will follow and increase the pitch of the foil or rotor blade as the cam moves in a slot (not shown) in one of the beams 357 seen in FIGURE 22, for example. For collective pitch control it will be noted that increased rotor speed will compress the spring 354 due to the weight 353, moving the cam 352 to the right within the cylinder 355 as permitted by the slot 359 and thus increasing pitch, thereby tending to slow down the rotor blade. This tends to produce a constant speed of rotation for the rotor assembly. To introduce cyclic pitch, as the cable 340 is allowed to move outward slightly, the cylinder 355 moves outward, thus permitting the cam to move and increase blade pitch, whereas when the cable 340 moves inward at the other side of the vehicle in a given cycle, the cylinder 355 is pulled in and pitch is decreased.

A cross-sectional view of one of the foils or rotor blades 302 is seen in FIGURE 22 wherein it may be noted that the aerodynamic shape is one of conventional type, for this embodiment the distance from leading edge to trailing edge of the blade being about ten inches. Structurally, in addition to the cylindrical spar 350, the blade may contain spar caps 356 and beams 357. Except for the skins which may be stainless steel, and the leading and trailing tips, which are solid metal, the interior of the blade may be filled with honeycomb or other filler 358. Of course, the particular type of foil or blade is not critical here.

The position of the parachute compartment 308 above the rotor blades is an important feature here, it being noted that in the conventional helicopter this arrangement is not possible. The position of the compartment permits deployment of the parachute while the airfoils are still rotating and a unique emergency landing procedure may be used. The torroid-shaped air storage tank within the fuselage may store enough high pressure air for perhaps two minutes of operation of the rotor blades. Thus, if the vehicle is at a high altitude the parachute may be first deployed, upon failure of the compressor or engine, and the pressurized air in the emergency storage tank retained. Then, as the vehicle nears the ground the parachute may be jettisoned and the reserve air in the storage tank used to land the vehicle in the desired area rather than depending upon the uncertainty of a parachute descent all the way to the ground.

Some of the other important features of the rotary wing aircraft of this invention may be noted here. The fuselage shape which is almost spherical provides a maximum volume for a given outer surface area, as well as maximum structural strength for a given weight, and is of course compatible with the rotor system. This rotor system, rotating about the center of the fuselage, does not exert the downward force on the fuselage as exists in the conventional helicopter due to down-wash from the rotor which is positioned above the fuselage. The inflow of air from the top along the spherical fuselage is excellent, and there is a slight increase in lift due to pressure reduction on the top of the fuselage. In a conventional helicopter, the inboard ends of the rotor blades have little left, but introduced drag, due to their low relative speed compared to the outer ends. In the present vehicle, however, this factor does not exist at nearly as great an extent due to the fact that the rotor blades do not extend into a hub. Also, compared to the conventional helicopter the drag introduced by the rotor head and pitch linkage assembly is eliminated. The low position of the rotor produces a quicker entry into ground effect on descent.

Another feature of the invention which should be noted in detail is the rotor tip, full impulse, turbine which drives the outer ends of the rotor blades. This arrangement eliminates the initial expense, the maintenance expense, and the weight of the elaborate transmission needed in a conventional helicopter. Aside from the transmission itself, weight advantages occur due to the elimination of the fuselage structure required to support the transmission and oppose the engine/transmission torque in a conventional craft. The transmission oil system, including cooling, is another factor eliminated. The fixed part of the outer track including the turbine nozzle manifold gives some ducted fan effect, rather than that of the conventional rotor, which produces better inflow characteristics and eliminates some of the induced drag of the rotor tips. The rotor tip turbine requires minimum structural weight for a given torque power, and the full impulse turbine eliminates problems of stage sealing and gas distribution to the nozzles. The rotating outer ring, holding the turbine blades, provides excellent structural positioning of the rotor blade tips and eliminates much of the stresses in the rotor blades due to the Coriolis effect. The angle of the turbine nozzles for driving the rotor blades, being almost radial, while producing an efficiency of perhaps 50% instead of a possible 85%, for example, produces significant advantages over a lower angle. First, dissipation of power and anti-torque purposes is not required, nor is the increased weight and complexity of a tail rotor or the like. Construction and maintenance costs are thereby lowered. The use of low pressure, low temperature turbine air permits the use of low cost injection molded turbine blades and the use of low cost fiberglass air distribution ducting.

The pitch control arrangement in the center of the rotor blades illustrated in the second embodiment provides several advantages. The automatic centrifugally operated collective pitch control simplifies the control system for the aircraft and permits easier instrument flight and less demand on pilot attention and coordination, as well as reduced pilot fatigue and simplified pilot training. This arrangement also reduces parasitic drag and blade twist as well as reducing weight and blade stresses.

The size of the vehicle can vary over a relatively large range. Thus, the principles of the invention can be adapted to a toy. On the other hand, extremely large vehicles are feasible. It will be noted, however, that in the larger vehicles, the spherical body would not be desirable in most instances, although the body would be round in cross section along a plane to which the driving mechanism is attached. It will also be appreciated that fluids other than compressed air can be used for driving the air foils. For example, one or more combustion chambers adapted for producing hot gases under pressure could be positioned either within the body of the aircraft or along the periphery of the track through which the air foils are driven, much in the manner of a conventional gas turbine.

Although the invention has been described with respect to particular preferred embodiments thereof, many changes and modifications will become apparent to those skilled in the art in view of the foregoing description which is intended to be illustrative and not limiting of the invention.

What I claim is:
1. An improved rotary wing aircraft comprising
a body; means defining a non-rotatable inner circular track encircling said body, said inner track means being disposed in a substantially horizontal plane relative to said body; means defining a circular outer track encircling said body; said outer track means being disposed in a plane substantially parallel to that of said inner track means and being concentric therewith; strut means for non-rotatably connecting said outer track means to said body;

a rotor comprising: an inner ring rotatably supported by said inner track; a plurality of elongated airfoils connected at one end to said inner ring and extending radially outward therefrom; and an outer ring concentric with said inner ring to which the outer ends of said airfoils are connected, said outer ring including means responsive to the flow of pressurized gas for effecting rotation of said rotor within said track means;

means associated with said outer track means for directing pressurized gas to said rotor gas responsive means;

said strut means being hingedly connected to said body and to said outer track means to permit axial movement of said outer track means relative to the axis of rotor rotation; and said rotor airfoils being hingedly connected to said inner ring and to said outer ring to permit corresponding axial movement of said outer ring;

means providing a source of pressurized gas carried within said body; and conduit means for carrying and pressurized gas from said source to said gas directing means associated with said outer track means.

2. A rotary wing aricraft as set forth in claim 1 wherein said struts define said pressurized gas conduit means.

3. The rotary wing aircraft as set forth in claim 1 wherein said rotor pressurized gas responsive means comprises a plurality of turbine blades spaced around the periphery of said outer ring; and wherein said outer track means gas directing means comprises a plurality of nozzles spaced about the periphery thereof for directing pressurized gas against said turbine blades.

4. A rotary wing aircraft as set forth in claim 3 wherein said nozzles are directed downwardly relative to the plane of said outer track means, whereby the gas flow from said nozzles produces a component of force acting to lift or support said outer track means.

5. A rotary wing aircraft as set forth in claim 2 wherein said outer track means defines at least one manifold or pressurized gas; wherein said struts define said pressurized gas conduit means and communicate with said manifold and said gas directing means communicating with said manifold.

6. A rotary wing aircraft as set forth in claim 1 wherein said outer track means and said rotor outer ring are of fixed diameters; wherein said struts and said airfoil members are longitudinally extensible to permit said axial movement of said outer track means and said rotor outer ring.

7. A rotary wing aircraft as set forth in claim 6 wherein said airfoils are connected to said outer ring by means accommodating relative radial movement between said ring and the outer ends of said airfoils.

8. A rotary wing aircraft as set forth in claim 7 wherein each of said struts comprises telescoping members permitting elongation thereof.

9. A rotary wing aircraft as set forth in claim 5 including fluid bearing means associated with said outer track means and said rotor outer ring to maintain separation therebetween; and means for directing pressurized gas from said manifold to said fluid bearing means.

10. A rotary wing aircraft as set forth in claim 1 including means independent of said body defining said inner track means; and means for varying the angle of the plane of said inner track means and of said rotor, relative to said body, to control the direction of movement of the aircraft.

11. A rotary wing aircraft as set forth in claim 10 including a plurality of pneumatic cylinders connecting said independent inner track means to said body; and means for controlling said pneumatic cylinders to vary the angle of the plane of said inner track means and rotor relative to said body to control the direction of movement of the aircraft.

12. A rotary wing aircraft as set forth in claim 1 including means for varying the angle of the plane of said rotor relative to said body; and said body having its center of gravity below said rotor and being of sufficient weight that the inclination of said rotor does not result in substantial inclination of said body.

13. A rotary wing aircraft as set forth in claim 1 including a vessel defining a reservoir for compressed gas; gas pumping means for filling said reservoir with compressed gas; and said reservoir serving as an emergency source of pressurized gas for driving said rotor.

14. A rotary wing aircraft as set forth in claim 13 wherein said source of pressurized gas is an air compressor; and wherein said air compressor serves as said gas pump means for filling said reservoir.

15. A rotary wing aircarft as set forth in claim 1 including one or more vessels disposed in said body for containing pressurized gas; and means for selectively connecting said vessels to said conduit means to provide an emergency source of pressurized gas for driving said rotor.

16. A rotary wing aircraft as set forth in claim 1 including a cushion member secured to the under surface of said body for supporting said body when not in flight.

17. A rotary wing aircraft as set forth in claim 1 including an annular member secured to the under surface of said body for supporting said aircraft when not in flight, said annular member encircling the lower portion of said body and extending below the lowermost surface of said body.

18. A rotary wing aircraft as set forth in claim 17 wherein said annular support member and the lower portion of said body define a downward opening recess; and means for admitting pressurized gas from said source into said recess to provide a cushion of air for supporting said aircraft on the supporting surface whereby said aircraft may be moved along said surface.

References Cited

UNITED STATES PATENTS

| | | | |
|---|---|---|---|
| 1,868,292 | 7/1932 | Leffert | 244—17.23 |
| 2,953,320 | 9/1960 | Parry | 244—12 |
| 3,007,372 | 11/1961 | Baxter | 244—17.11 XR |
| 3,082,977 | 3/1963 | Arlin | 244—17.23 |
| 3,135,481 | 6/1964 | Sudrow | 244—23 |
| 3,182,929 | 5/1965 | Lemberger | 244—12 |
| 3,215,370 | 11/1965 | Strydom | 244—17.11 |
| 3,321,156 | 5/1967 | McMasters | 244—12 XR |

FOREIGN PATENTS

| | | |
|---|---|---|
| 1,245,769 | 10/1960 | France. |
| 760,571 | 11/1956 | Great Britain. |

MILTON BUCHLER, Primary Examiner

P. E. SAUBERER, Assistant Examiner

U.S. Cl. X.R.

244—23, 12